March 24, 1964   J. D. LILLEY   3,125,776
MOULDED QUILLS
Filed Dec. 7, 1960

JOHN DAVID
LILLEY, inventor.
by:
J. B. Felshin
attorney.

United States Patent Office

3,125,776
Patented Mar. 24, 1964

3,125,776
MOULDED QUILLS
John David Lilley, Hertford, England, assignor to Addis Limited, Hertford, England, a company of Great Britain
Filed Dec. 7, 1960, Ser. No. 74,285
15 Claims. (Cl. 15—159)

This invention is concerned with tapered elongated articles (hereinafter referred to as quills) moulded from rubber or plastics and particularly though not essentially to the tufts of brushes and the teeth of combs.

Brushes and combs have been made for many years with quills of round section and tapered lengthwise formed by moulding rubber or plastic materials. When making the moulds it is usual to form the cavity in which the quill is moulded by drilling the hole with a tapered drill. It is found, however, that when very long tapered holes are required, it is impracticable to drill these without breaking the drills and moulds have therefore been made which are built up of flat plates wherein each half of the quill is milled with a half round milling cutter in appropriate position, and the plates are then clamped together to form the mould.

A quill in accordance with the present invention is moulded of plastic or rubber with its end split to provide two feathered tips. Such a quill whilst having adequate rigidity for its intended purpose, has a softer end and brushes or sweeps more efficiently.

Figure 1:
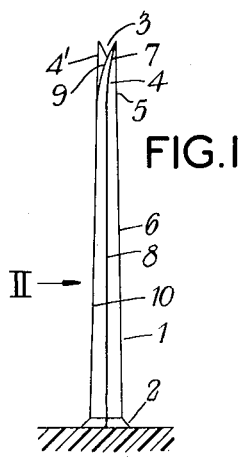
Figure 2:
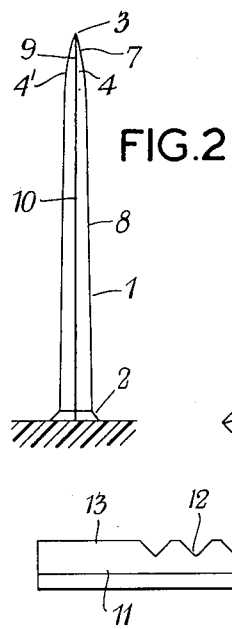
Figure 4:
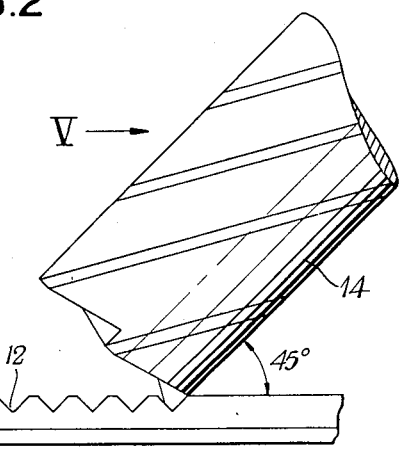
Figure 3:
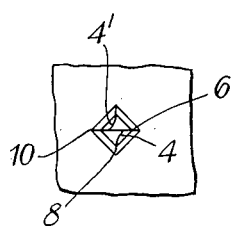
Figure 5:
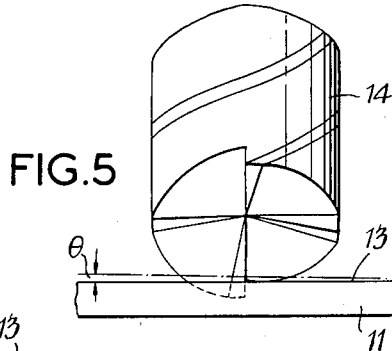
Figure 6:
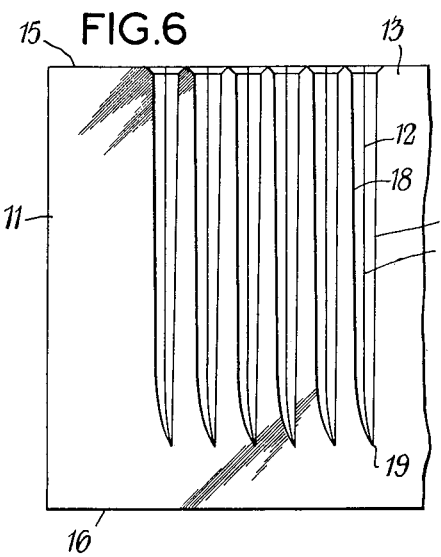
Figure 7:
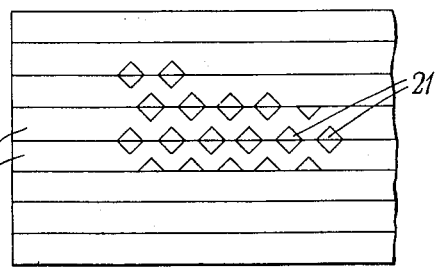

Other parts of the invention are embodied in the preferred form which will now be described in some detail by way of example with reference to the accompanying drawings in which:

FIG. 1 is a side view of a quill;
FIG. 2 is a view of the quill in the direction of arrow 11 of FIG. 1;
FIG. 3 is a plan of the quill;
FIG. 4 is a diagram showing the method of cutting the mould for the quills;
FIG. 5 is a view in the direction of arrow V of FIG. 4;
FIG. 6 is a plan view of a mould plate; and
FIG. 7 is an end view of an assembly of mould plates.

As shown in FIGS. 1 to 3, the quill 1, moulded from plastic or rubber, is of square section and tapers from its root 2 towards its end 3. Its end is provided with two feathered tips 4, 4'. Each tip is defined by a straight edge 5 which is an extension of one edge 6 of the square section of the quill, a curved edge 7 extending from an adjacent edge 8 of the square to the edge 5 and a second curved edge 9 extending from an edge 10 diagonally opposite to the edge 6 to the intersection of edges 5 and 7. The extreme points of the tips 4, 4' are at diagonally opposite corners when the quill is viewed end on.

The tips 4, 4' are formed by moulding in a mould comprising superimposed mould plates 11, each of which is made by the method illustrated in FIGS. 4 and 5.

A series of slots 12 are cut in the face 13 of a plate 11 by means of an end mill 14 set at an angle of 45° to the surface 13 of the plate. The slots 11 run from one edge 15 of the plate and finish short of the opposite edge 16 of tthe plate. They are triangular in section. As the end mill 14 comes out at the end of the slot 12, it cuts less deeply into the plate 11 so that whilst one top edge 17 of the slot remains straight, the other top edge 18 curves round to meet the straight edge at a point 19. The bottom edge 20 of the slot also curves round to meet the edges 17 and 18 at the point 19. In other words, the slot sweeps round to one side at the end.

The slots 12 are tapered lengthwise by inclining the plate 11 at an angle $\theta$ to the line along which the cutter moves, indicated by chain dotted lines in FIG. 5.

A mould is formed by superimposing two such plates 11 one above the other so that the slots 12 in one plate cooperate with those in the other plate to form tapered square section holes 21 as shown in FIG. 6. The blind ends of these holes sweep out in opposite directions.

When plastic or rubber is moulded in the moulds, quills are formed which have two feathered tips to each quill as described above. Such a quill is found to be softer and to brush or sweep more efficiently than ordinarily tapered quills.

Whilst the invention is particularly applicable to the injection moulding of polythene, it is also applicable to other moulding processes and to other materials; for example, compression moulding of rubber or other plastics.

It will be understood that the invention is not restricted to the details of the preferred form described by way of example which may be modified without departing from the broad ideas underlying them.

What we claim is:

1. A quill having its end split to form two feathered tips extending in opposite directions from one plane and having flat surfaces in a common plane at right angles to said one plane.

2. A quill with a square cross section for the greater part of its length and terminating in two feathered tips of triangular cross-section at diagonally opposite corners of the square section, said tips extending to opposite sides of one plane, and lying on opposite sides of another plane at right angles to the first plane.

3. A quill according to claim 2 which is tapered decreasing in section towards the feathered end.

4. A quill comprising a shank portion and two feathered ends at one end of the shank, said shank tapering down toward said feathered ends, said feathered ends extending in opposite directions relative to one plane, and lying on opposite sides of a common plane at right angles to the first plane, and having portions adjacent said common plane.

5. The combination of claim 4, said shank being of square cross-section throughout, said feathered ends being of triangular cross-section and terminating in points.

6. The combination of claim 5, said quill comprising a brush or comb quill made of flexible material.

7. A quill comprising an elongated shank and having at one end of said shank, a pair of tips disposed on opposite sides of a common plane, and said tips being offset from one another and located on opposite sides of another plane at right angles to said common plane and intersecting said common plane.

8. The combination of claim 7, said shank being straight and the intersection of said common plane and other plane extending through the longitudinal axis of said shank.

9. The combination of claim 7, said tips having surfaces in said common plane.

10. The combination of claim 9, said surfaces being flat.

11. The combination of claim 7, said shank being of quadrangular transverse cross-section and said tips being of triangular cross-section.

12. The combination of claim 11, and said tips terminating in points.

13. The combination of claim 7, said shank being tapered longitudinally, reducing in cross-section toward said one end.

14. The combination of claim 11, said common plane passing through a pair of diagonally opposed edges of said shank, said tips having outer longitudinal edges forming continuations of said diagonally opposed edges, and said tips having inner longitudinal edges which are curved outwardly away from each other, and said tips terminating on points where said outer and inner edges of said tips meet.

15. A quill comprising a shank of square cross section, tapering down toward its outer end and provided at said end, with two feathered tips, each defined by a straight edge which is an extension of a first longitudinal edge of the shank, a first curved edge extending from an adjacent longitudinal edge of the shank, and a second curved edge extending from a longitudinal edge of the shank diagonally opposite to the first longitudinal edge of the shank to the intersection of the straight edge of the tip and said first curved edge of the tip, to form a point, said tips extending to opposite sides of one plane, and being disposed on opposite sides of another plane at right angles to the first plane.

References Cited in the file of this patent

UNITED STATES PATENTS

| | | |
|---|---|---|
| 170,975 | Wetmore | Dec. 14, 1875 |
| 665,632 | Finiels | Jan. 8, 1901 |
| 952,491 | Youngs | Mar. 22, 1910 |
| 1,112,020 | Merrick | Sept. 29, 1914 |
| 1,476,593 | Coffey | Dec. 4, 1923 |
| 2,112,857 | Matechik | Apr. 5, 1938 |
| 2,238,304 | Belanger | Apr. 15, 1941 |
| 2,250,112 | Larson | July 22, 1941 |
| 2,397,086 | Brady | Mar. 26, 1946 |
| 2,504,330 | Henley | Apr. 18, 1950 |
| 2,621,369 | Gantz et al. | Dec. 16, 1952 |
| 2,812,530 | Whitesel | Nov. 12, 1957 |

FOREIGN PATENTS

| | | |
|---|---|---|
| 748,723 | Great Britain | May 9, 1956 |
| 950,461 | Germany | Oct. 11, 1956 |